F. S. BRYANT.
TIRE.
APPLICATION FILED APR. 1, 1913.
1,139,338.
Patented May 11, 1915.
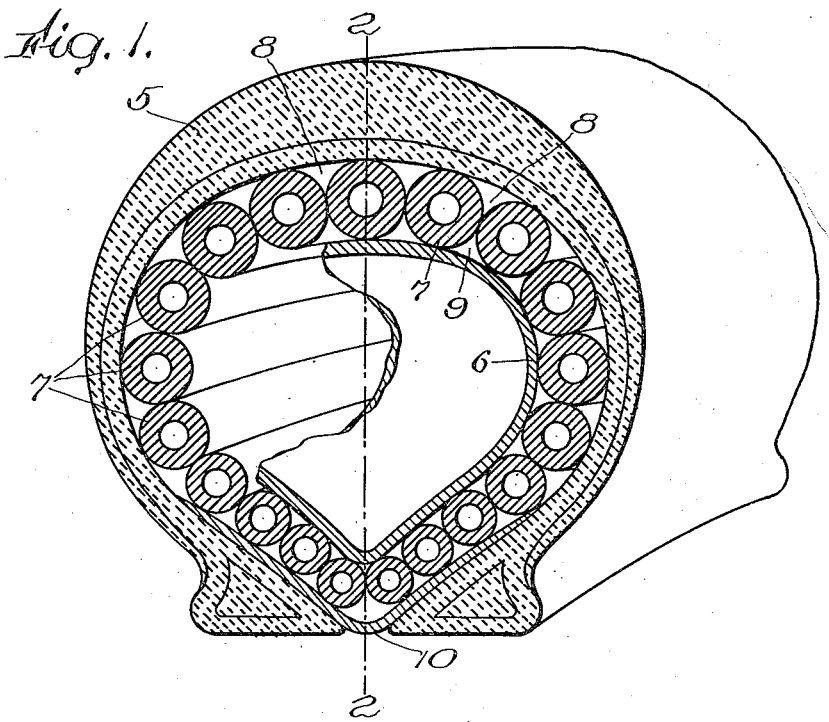
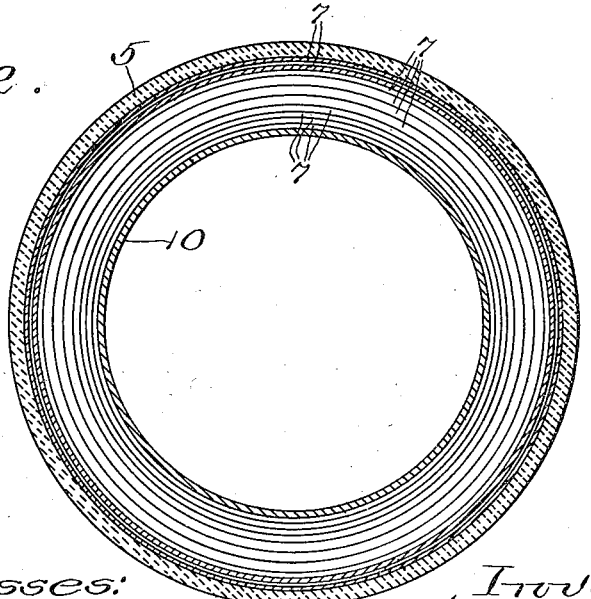

UNITED STATES PATENT OFFICE.

FREDRICK S. BRYANT, OF READING, MASSACHUSETTS.

TIRE.

1,139,338. Specification of Letters Patent. Patented May 11, 1915.

Application filed April 1, 1913. Serial No. 758,267.

*To all whom it may concern:*

Be it known that I, FREDRICK S. BRYANT, a citizen of the United States, residing at Reading, in the county of Middlesex and State of Massachusetts, have invented certain new and useful Improvements in Tires, of which the following is a specification.

This invention relates to tires for vehicles, and has particular reference to pneumatic tires. One of the chief reasons for the rapid deterioration of pneumatic tires, especially those employed for the wheels of automobiles, is that the sudden flexing in comparatively small locations or spots, as when passing over stones, causes local weakening, the results being commonly known as "stone bruises." Experience has shown that much of the injury is due to the sudden return of the material of the tire to normal position after it has been sharply pressed inwardly. Of course, when the depression or compression extends along a considerable area of the tire, the return is more gradual and does not produce the local injuries that result from passing over stones. When the tire is weakened in comparatively small localities it finally results in a "blow-out" in one or more places.

The object of this invention is to provide an improved tire having means which will retard the outward movement of a comparatively small portion of the tire, without interfering with the resilience or "liveliness" of the tire as a whole, the effect and action in my improved tire being somewhat comparable with that of a shock-absorber, which latter prevents a sudden rebound of a vehicle body after the springs supporting it have been collapsed.

My invention consists in the improvements which I shall now proceed to describe and claim.

Of the accompanying drawings,—Figure 1 is a sectional perspective view of one embodiment of my improved tire. Fig. 2 is a sectional view of a complete tire, the line of section being indicated at 2—2 of Fig. 1, the inner tube being omitted.

The same reference characters indicate the same parts in all of the views.

Referring first to Fig. 1, 5 indicates a tire shoe of a well known form. The inner tube 6 is considerably smaller than what would be required if the intermediate devices presently described were not employed. This tube 6 may be either the inflatable tube used in a pneumatic tire, or it may be a fabric lining within which the usual inflatable tube is placed.

Between the shoe 5 and the tube 6 I locate a series of intermediate circumferential tubes 7, these forming hermetically closed air chambers. Preferably, the tubes 7 are of gradually smaller diameter from the tread toward the inner side of the tire. The tubes 7 are of yielding material and of such form that outer circumferential air chambers 8 are formed between their outer portions and the inner wall of the shoe, and inner circumferential air chambers 9 are formed between their under portions and the tube 6. The tubes 7 are held normally expanded and in contact with each other by the air confined within them, and normally prevent communication between the outer and inner air chambers. When the shoe is compressed or indented air is forced between the tubes 7 into the inner chambers 9. This, however, takes place only under extraordinary local compression. Then after the cause of the compression has been passed, the tendency of the indented portion of the shoe to return to its normal position will cause a partial vacuum in the outer chambers 8, which vacuum can only be filled or supplied by air from the chambers 8. Since the tubes 7 bind against each other, and are also somewhat flattened out under tread compression, the air that has been compressed in the inner chambers 9 cannot be readily forced by the expansion of the inner tube into the outer chambers 8, and hence, the action is such as to retard outward movement of the portion of the shoe that has been pressed inwardly or indented. This resists or retards the return of the shoe to normal position, on the same principle as of the usual and well known shock-absorber. While the tire as a whole will serve its usual purpose without being affected by my improved construction, owing to the fact that the ordinary extent of compression reaches well along the portion of the tread that is on the ground, if the tire passes over a stone the sudden indentation drives the air from the outer chambers 8 to the inner chambers 9 as just described, the return of the depressed or indented portion of the tire to normal position being retarded.

A strip 10 of any suitable material, bridges the opening between the edges of the shoe 5, to hold the intermediate tubes 7 in place.

It will be readily understood that a tire constructed according to my invention possesses the further advantage of being less subject to puncture than the ordinary tire, because any article or instrument, such as a nail, would have to be considerably longer to be driven through the shoe and to reach through the inner tube 6, than if the intermediate devices or strips were omitted.

I claim:

A tire of the character described comprising a shoe, an inflatable inner tube, and a series of intermediate tubes parallel with and entirely surrounding said inner tube, being interposed between the latter and said shoe, said intermediate tubes abutting against each other and against said shoe and inner tube with sufficient radial pressure to provide a series of normally isolated oppositely disposed inner and outer air chambers, and to prevent separation of said intermediate tubes from each other except under extraordinary local depressions.

In testimony whereof I have affixed my signature, in presence of two witnesses.

FREDRICK S. BRYANT.

Witnesses:
C. F. BROWN,
P. W. PEZZETTI.